United States Patent [19]

Miller

[11] 3,917,210

[45] Nov. 4, 1975

[54] ADJUSTABLE SUPPORT FOR VEHICLE SEATS

[76] Inventor: Herscheal W. Miller, 432 Fairmount, Davenport, Iowa 52802

[22] Filed: Aug. 6, 1974

[21] Appl. No.: 495,207

[52] U.S. Cl. ............................. 248/419; 297/346
[51] Int. Cl.² ............................................. B60N 1/02
[58] Field of Search .......... 248/419, 421, 422, 393, 248/424, 157; 297/346, 348

[56] References Cited
UNITED STATES PATENTS

| | | | |
|---|---|---|---|
| 1,957,785 | 5/1934 | Knapp | 248/422 X |
| 2,345,182 | 3/1944 | Corber | 248/419 |
| 2,555,804 | 6/1951 | McCarthy | 248/419 |
| 2,827,947 | 3/1958 | Wilkinson | 248/419 |
| 2,919,744 | 1/1960 | Tanaka | 297/346 X |

FOREIGN PATENTS OR APPLICATIONS 534,781   3/1941   United Kingdom............... 248/419

*Primary Examiner*—Roy D. Frazier
*Assistant Examiner*—Robert W. Gibson, Jr.
*Attorney, Agent, or Firm*—Henderson & Strom

[57] ABSTRACT

A first support for attachment to a vehicle, a second support carrying the vehicle seat, and a third support which is adjustable and which interconnects the first and second supports. Vertical and horizontal adjustment bolts are rotatably affixed between the first and second supports. A cranking assembly affixed to the second support engages and rotates either the vertical bolt or the horizontal bolt thereby altering the vertical and horizontal disposition of the second support with respect to the first support.

7 Claims, 7 Drawing Figures

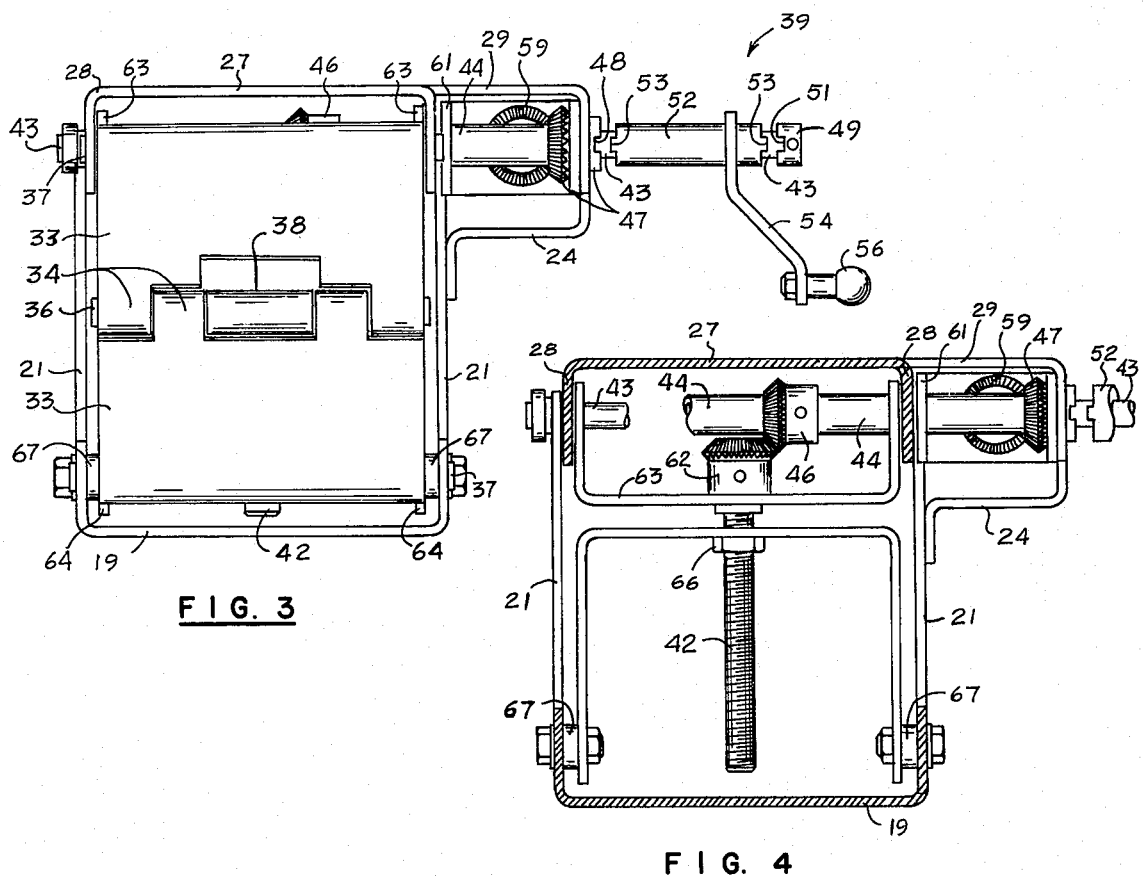
FIG. 3
FIG. 4
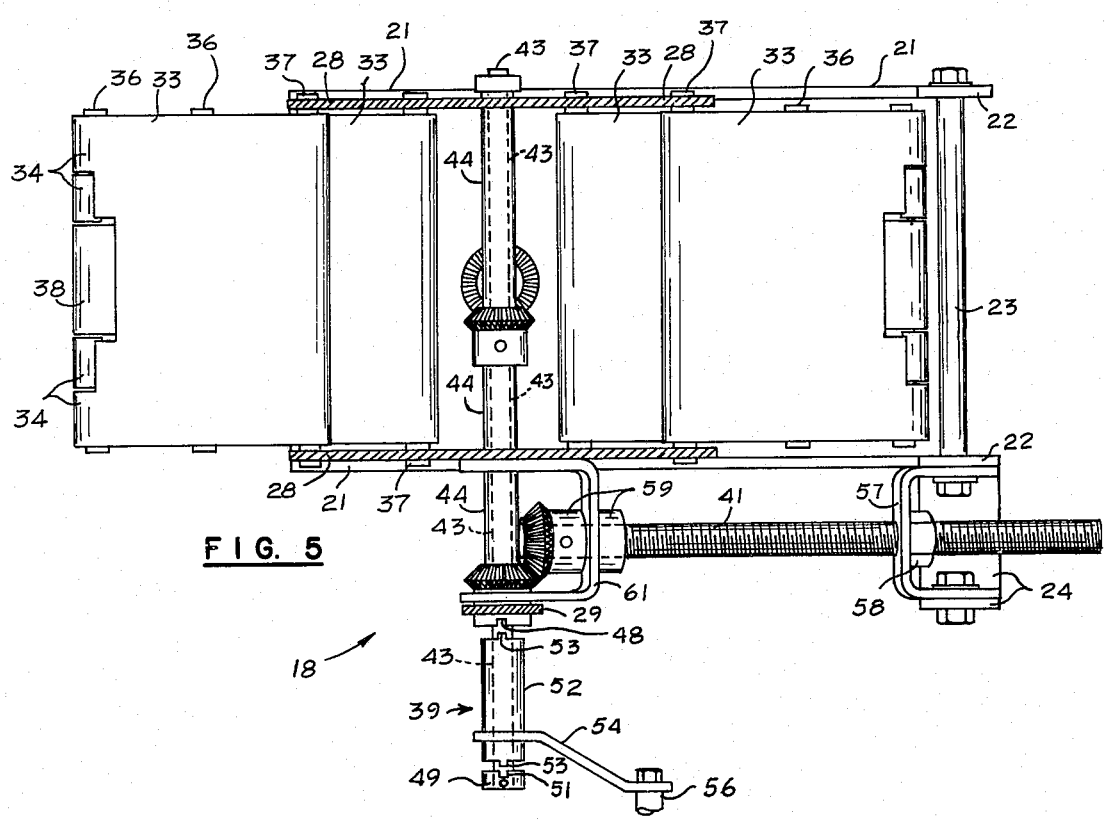
FIG. 5

3,917,210

ADJUSTABLE SUPPORT FOR VEHICLE SEATS

BACKGROUND OF THE INVENTION

This invention relates generally to adjustable support structures for vehicle seats and more particularly to seat supports for tractors and other agricultural vehicles.

Most known seat supports rely on a sliding adjustment construction at least for horizontal adjustment. Sliding adjustment structures are not particularly suited for agricultural vehicles. U.S. Pat. No. 3,633,864 illustrates a device for usage with farm vehicles which provides for horizontal and vertical adjustment in a manner other than by a sliding adjustment construction. The invention illustrated therein provides for a plurality of control devices. A simpler and more swiftly and easily operated structure would result if a seat support with a single control apparatus could be devised. This invention is directed toward such a structure.

SUMMARY OF THE INVENTION

According to this invention, an adjustable support for vehicle seats is provided which is suitable for usage in agricultural vehicles.

A first support member has a base and side members, the base being fixed securely to the surface of the vehicle. A second support member has a plate and side members, the seat and the shock absorption apparatus for the seat being mounted upon the plate. A third support member interconnects the first and second support members. The third support includes a plurality of members which are pivotally attached at one end to the sides of the first support and at the other end to the sides of the second support. Each of the plurality of members is hinged intermediate its ends.

An adjustment member changes the vertical and horizontal disposition of the second support with respect to the first support, the third support bending and pivoting to hold the first and second supports in their adjusted relationship. The adjustment member includes a cranking assembly journalled in the sides of the second support which alternately engages either horizontal or vertical adjustment bolts. The vertical bolt is pivotally affixed between the base of the first support and the cranking assembly. The horizontal bolt is pivotally affixed between one of the sides of the first support and one of the sides of the second support.

It is an object of this invention to provide a novel adjustable seat support for agricultural vehicles.

It is a further object of this invention to provide an adjustable seat support which is simple in construction and use by providing an adjustment apparatus which incorporates both horizontal and vertical adjustment controls into a single unique structure.

Another object of this invention is to provide an adjustable seat support which is economical to manufacture and sufficiently rugged in construction to properly operate in the environment of the farm vehicle.

These objects and other features and advantages of this invention will become readily apparent by reference to the following description when taken in conjunction with the accompanying drawings.

BRIEF DESCRIPTION OF THE DRAWINGS

The appended drawings illustrate the invention, wherein:

FIG. 3 is fragmentary end elevational view of the invention;

FIG. 4 is a cross sectional view of the invention taken along line 4—4 of FIG. 1 with some parts of the invention shown being partially cut away;

FIG. 5 is a horizontal sectional view of the invention taken along line 5—5 of FIG. 1 with some parts of the invention shown being partially cut away;

DESCRIPTION OF THE PREFERRED EMBODIMENT

Figure 1:
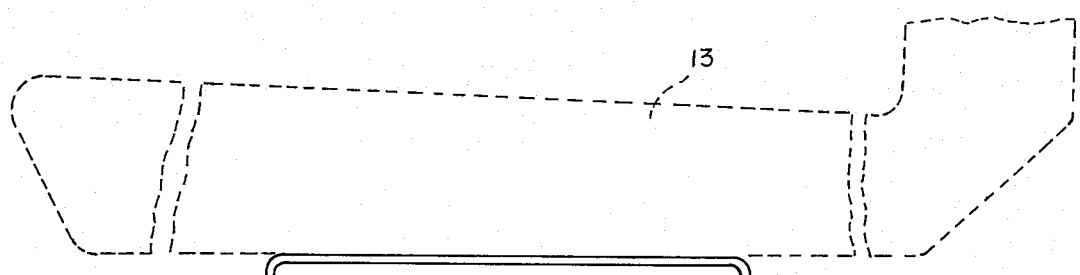
FIG. 1 is a side elevational view depicting the invention supporting a shock absorption unit with a vehicle seat mounted thereon.
Figure 1:
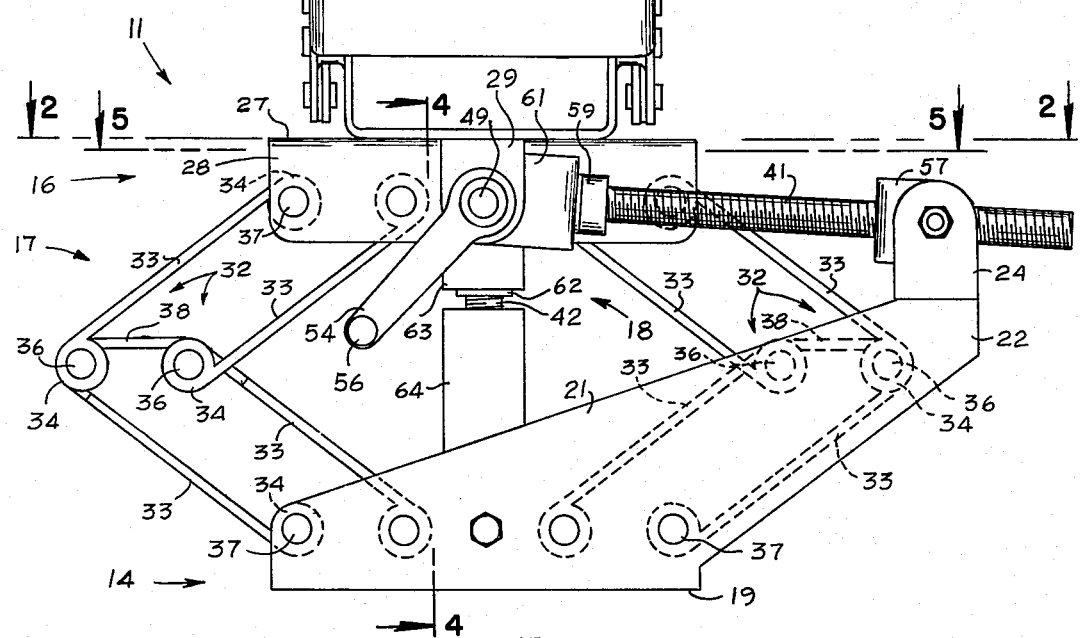

Referring now to the drawings, the invention is indicated generally at 11 in FIG. 1. A shock absorption device 12 is affixed to the invention 11, and a vehicle seat 13 is mounted upon the shock absorption device 12. The invention 11 more specifically includes a first support unit 14, a second support unit 16, a third support unit 17, and an adjustment unit 18.

Figure 2:
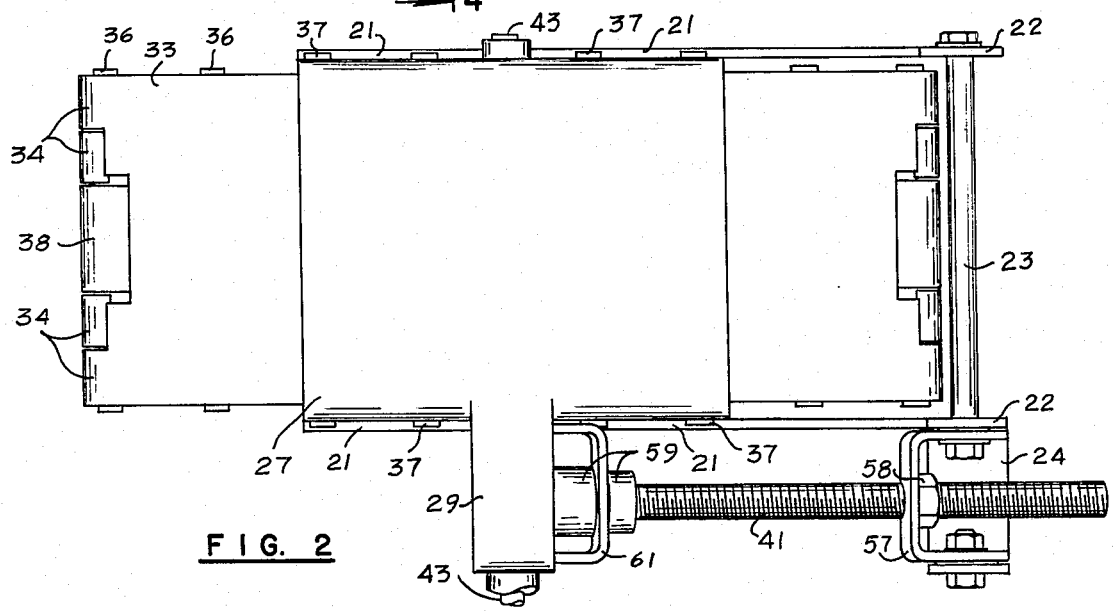
FIG. 2 is a top plan view of the device of this invention taken along line 2—2 of FIG. 1.

The first support unit 14, shown in FIGS. 1 and 2, includes a base plate member 19. The base member 19 is placed against the surface of the vehicle (not shown) and affixed thereto in a standard manner such as by weldment. Side members 21 are integrally formed with the base 19 along opposite edges of the base 19. The side members 21 turn upwardly from the base 19 and are normal thereto. The side members 21 are substantially triangular in shape, and portions 22 project upwardly from the uppermost corner of the triangular-shaped side members 21. A horizontal connecting bar 23 is affixed by nuts between the portions 22 for support. A bracket 24 is affixed to the projecting portion 22 of one of the side members 21.

The second support unit 16, depicted in FIGS. 1, 2 and 3, includes a plate member 27 upon which the shock absorption apparatus 12 and vehicle seat 13 are mounted. Side members 28 are integrally formed with the plate 27 along opposite edges of the plate 27, and the sides 28 are downwardly disposed from and in perpendicular relationship with the plate 27. The sides 28 are parallel to the sides 21. A bracket 29 extends from plate 27 and is on the same side of the invention 11 as the bracket 24.

The third support unit 17, depicted in FIGS. 1, 3 and 5, includes four adjustable units 32. Each of the units 32 include a pair of plates 33 having formed tubular portions 34 at each end. The plates 33 are joined end to end, the portions 34 of each plate 33 meshing together, by a hinge pin 36 to form a butt type of hinge. The ends of the plates 33 opposite the joined ends are pivotally affixed to the sides 21 and to the sides 28 by pivot pins 37 passed through aligned openings in the sides 21, 28 and the formed portions 34. The third support unit 17 thereby interconnects the first support unit 14 and the second support unit 16.

Two support plates 38 are affixed between the joined ends of the plates 33 of different pairs of adjustable units 32. The units 32 are thereby made to operate in pairs, and the third support unit 17 strengthened, by the support plates 38.

Referring to FIGS. 3, 4 and 5, the adjustment unit 18 includes a cranking assembly 39, a horizontal adjustment bolt 41 and a vertical adjustment bolt 42. The cranking assembly 39 includes a rotatable shaft 43 which is received intermediate the ends of and through aligned openings in the side members 28 and bracket 29. Fixed shaft portions 44 are affixed over the rotatable shaft 43. A first bevel gear 46 is affixed to the rotatable shaft 43 between shaft portions 44 and between the side members 28. A second bevel gear 47 is also affixed to the rotatable shaft 43. The bracket 29 is affixed around the bevel gear 47. The end of the bevel gear 47 opposite the gear teeth and extended beyond the bracket 29 has key ways 48 formed therein.

The rotatable shaft 43 extends beyond the bracket 29 and has affixed thereon an end cap 49. The end cap 49 has key ways 51 formed therein and directed back along the rotatable shaft 43 toward the bevel gear 47. A collar 52, having key members 53 formed at each end, is slidably affixed over the rotatable shaft 43. An S-shaped arm or crank 54 is affixed at one end to the collar 52 and at the other end has a handle 56 affixed thereto.

The horizontal adjustment bolt 41, most clearly illustrated in FIG. 5, is threaded along its length. A rear bracket 57, having a hole formed therein and a nut 58 welded thereon registered with the hole, and being pivotally affixed by conventional means to bracket 24, receives one end of the threaded bolt 41. A third bevel gear 59 is affixed to the opposite end of the bolt 41 and is rotatably fixed in a front bracket 61. The front bracket 61 is pivotally attached over the rotatable shaft 43 adjacent a side member 28 and over the second bevel gear 47 adjacent the bracket 29. The third bevel gear 59 meshes with the second bevel gear 47.

The vertical adjustment bolt 42, best depicted in FIG. 4, is threaded along its length and has affixed at its uppermost end a fourth bevel gear 62 which meshes with the first bevel gear 46. The bevel gear 62 is fixed in an upper U-shaped bracket 63 which is pivotally attached over the rotatable shaft 43 adjacent each of the sides 28. A lower U-shaped bracket 64, having a hole formed therein and a nut welded thereto and in alignment with the hole, rotatably receives the lower portion of the bolt 42. The bracket 64 is pivotally attached to the sides 21 at points intermediate the ends of the base 19. Spacer members 67 separate the sides 21 and the bracket 64.

Figure 6:
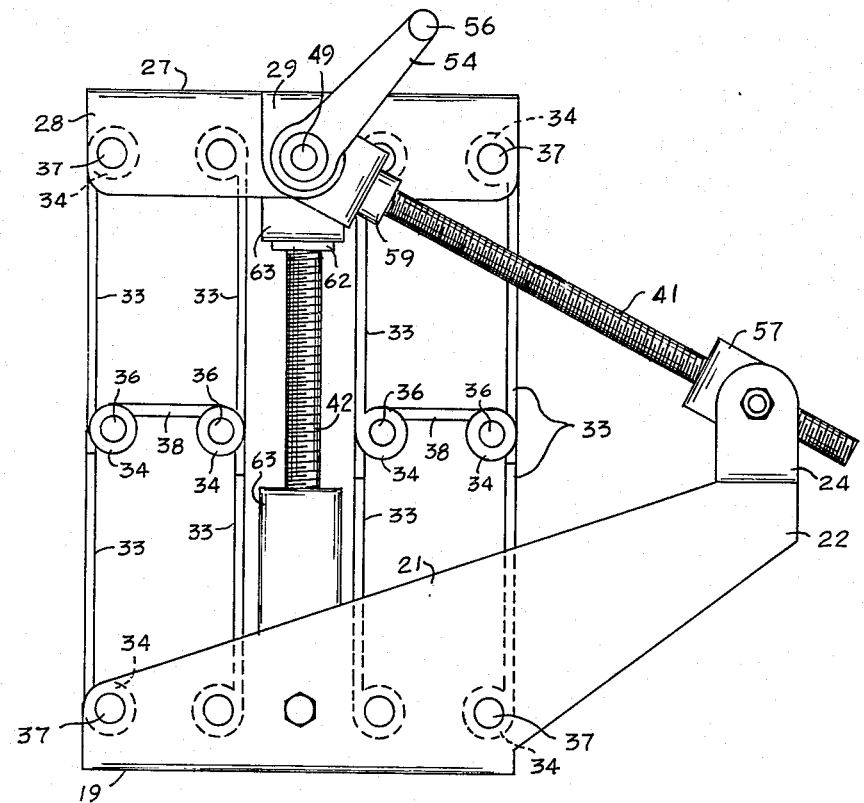
FIG. 6 is an end elevational view showing the invention in its fully extended position.
Figure 7:
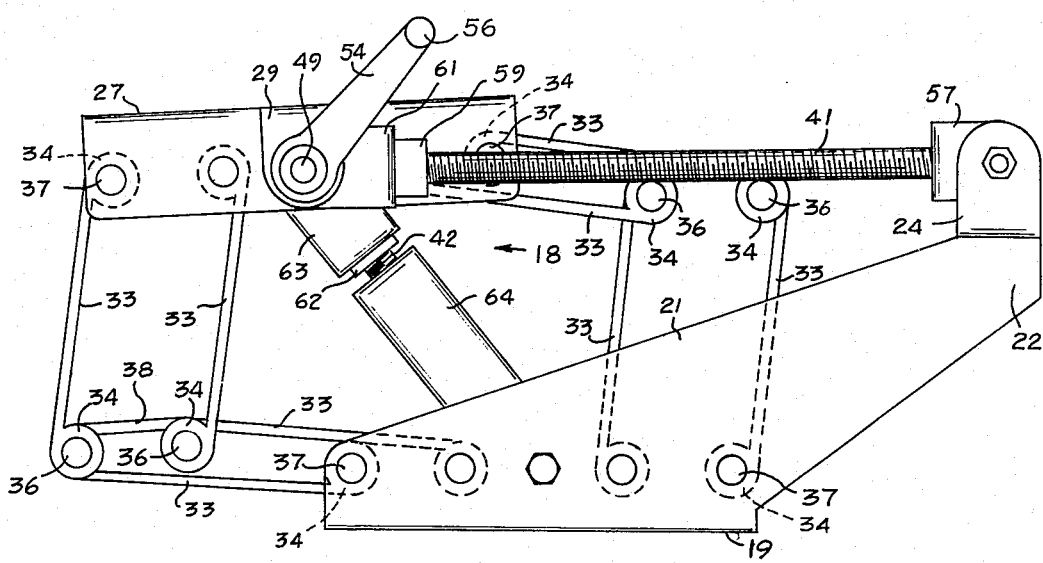
FIG. 7 is an end elevational view depicting the invention in its fully contracted position.

When in operation, the handle 56 of the cranking assembly 39 is grasped and the collar 52 is moved along the rotatable shaft 43 toward either the second bevel gear 47 or the end cap 49. The key members 53 of the collar 52 are made to engage the key ways 48 or 51. Rotation of the collar 52 when engaged with the end cap 49 will result in rotation of the rotatable shaft 43 and therefore of the first bevel gear 46. The fourth bevel gear 62 and therefore the vertical bolt 42 will be rotated by the gear 46. The vertical distance between the base 19 and plate 27 is thereby altered. Rotation of the collar 52 when engaged with the second bevel gear 47 results in rotation of the third bevel gear 59 and therefore of the horizontal bolt 41. The horizontal displacement of the base 19 with respect to the plate 27 is thereby altered. FIG. 6 illustrates the invention 11 in its most extended position, and FIG. 7 illustrates the most contracted position. Alternate engagement of the second bevel gear 47 and the end cap 49 by the collar 52 will result in either of these configurations or in any intermediate position.

As the movement of the bolts 41, 42 reorients the second support unit 16 with respect to the first support unit 14, the third support unit 17 takes on the configuration necessary to support the second support unit 16. The adjustable units 32, operating in pairs on each side of the vertical adjustment bolt 42, pivot about pins 36, 37 to assume the proper configuration. The plates 33 of each unit 32 are separated by 180° in the most extended position (FIG. 6) and by 90° in the most compact position (FIG. 7).

The invention 11 is particularly suited for use with agricultural vehicles due to the strong support provided by the metal plates 33 and cross-support plates 38 of third support unit 17. The use of threaded bolts 41, 42 instead of sliding parts for horizontal and vertical adjustment particularly adapts the invention 11 to the frequently dusty conditions to be found on farms. The use of a single cranking assembly 39 instead of a plurality of individual knob controls results in a device of simpler, swifter operation and simplified construction. It can therefore be seen that the objects of this invention have been attained.

Although a preferred embodiment has been disclosed herein, it is to be remembered that various modifications and alternate constructions can be made thereto without departing from the full scope of the invention, as defined in the appended claims.

I claim:

1. An adjustable support for vehicle seats comprising:
   a first means for support having a base member and first side members, said base being placed adjacent the surface of the vehicle and affixed thereto, said first side members being integrally formed with and along opposite edges of said base member and upturned therefrom;
   a second means for support having a plate member and second side members, said plate member being affixed to the seat of the vehicle, said second side members being integrally formed with and along opposite edges of said plate member and downwardly disposed therefrom;
   a third means for support having a plurality of adjustable units, each of said adjustable units being hinged intermediate its ends and being pivotally affixed at one end between said first side members and at the other end between said second side members; and
   a means for adjusting the horizontal and vertical relationship of said second means for support with respect to said first means for support, said means for adjusting having a horizontal adjustment bolt, a vertical adjustment bolt, and a means for selectively engaging and cranking said horizontal and said vertical adjustment bolts, said horizontal adjustment bolt being pivotally affixed at one end to one of said first side members and at the other end to one of said second side members, said horizontal adjustment bolt being disposed outside of the space enclosed by said first means and said second means and on the side of the plane formed by said one of said first side members and said one of said second side members opposite the side where said third means is disposed, said vertical adjustment bolt extending between and being pivotally affixed to said first side members and said second side members, said means for engaging and cranking being affixed to said one of said second side members and extending to the same side of said plane as said horizontal adjustment bolt.

2. An adjustable support for vehicle seats as defined in claim 1 wherein said first side members each have a projected portion such that a vertical plane passed through the ends of said projected portions does not intersect said base member, said horizontal bolt member being pivotally affixed to said projection of one of said first side members.

3. An adjustable support for vehicle seats as defined in claim 1 wherein said one of said second side members includes a bracket for pivotally receiving said horizontal bolt member.

4. An adjustable support for vehicle seats comprising:
a first means for support having a base member and first side members, said base being placed adjacent the surface of the vehicle and affixed thereto, said first side members being integrally formed with and along opposite edges of said base member and upturned therefrom;
a second means for support having a plate member and second side members, said plate member being affixed to the seat of the vehicle, said second side members being integrally formed with and along opposite edges of said plate member and downwardly disposed therefrom;
a third means for support having a plurality of adjustable units, each of said adjustable units being hinged intermediate its ends and being pivotally affixed at one end to said first means for support and at the other end to said second means for support; and
a means for adjusting the horizontal and vertical relationship of said second means for support with respect to said first means for support, said means for adjusting having a horizontal adjustment bolt, a vertical adjustment bolt, and a means for selectively engaging and cranking said horizontal and said vertical adjustment bolts, said horizontal adjustment bolt being pivotally affixed at one end to one of said first side members and at the other end to one of said second side members, said vertical adjustment bolt extending between and being pivotally affixed to said first side members and said second side members, said means for engaging and cranking being affixed to said second side members, said means for engaging and cranking comprising:
a rotatable shaft attached to said second side members and having an end cap affixed thereto;
first and second bevel gears affixed over said rotatable shaft, said first bevel gear being connected with and rotatable by said rotatable shaft, said first bevel gear being engaged with said vertical adjustment bolt, said second bevel gear being engaged with said horizontal adjustment bolt; and
a rotatable collar member slidably affixed over said rotatable shaft and alternately movable to positions of engagement with said second bevel gear and said end cap.

5. An adjustable support for vehicle seats as defined in claim 4 wherein said collar member includes key members at both ends, and said end cap and said second bevel gear include key ways, said key members being engageable with said key ways.

6. An adjustable support for vehicle seats as defined in claim 4 wherein said horizontal adjustment bolt includes at the end affixed to said first side member a third bevel gear, said third bevel gear being meshed with said second bevel gear.

7. An adjustable support for vehicle seats as defined in claim 4 wherein said vertical adjustment bolt includes at the end affixed to said first side members a fourth bevel gear, said fourth bevel gear being meshed with said first bevel gear.

* * * * *